Oct. 6, 1964  J. P. NICOSIA  3,151,862

GRIPPING DEVICE FOR CHUCK JAWS

Filed Aug. 8, 1961  2 Sheets-Sheet 1

INVENTOR.
Joseph P. Nicosia
BY
John B. Lowell
ATTORNEY

Oct. 6, 1964     J. P. NICOSIA     3,151,862
GRIPPING DEVICE FOR CHUCK JAWS
Filed Aug. 8, 1961     2 Sheets-Sheet 2
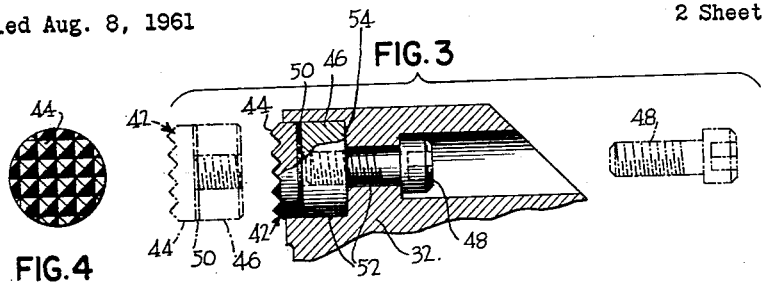
FIG. 3
FIG. 4
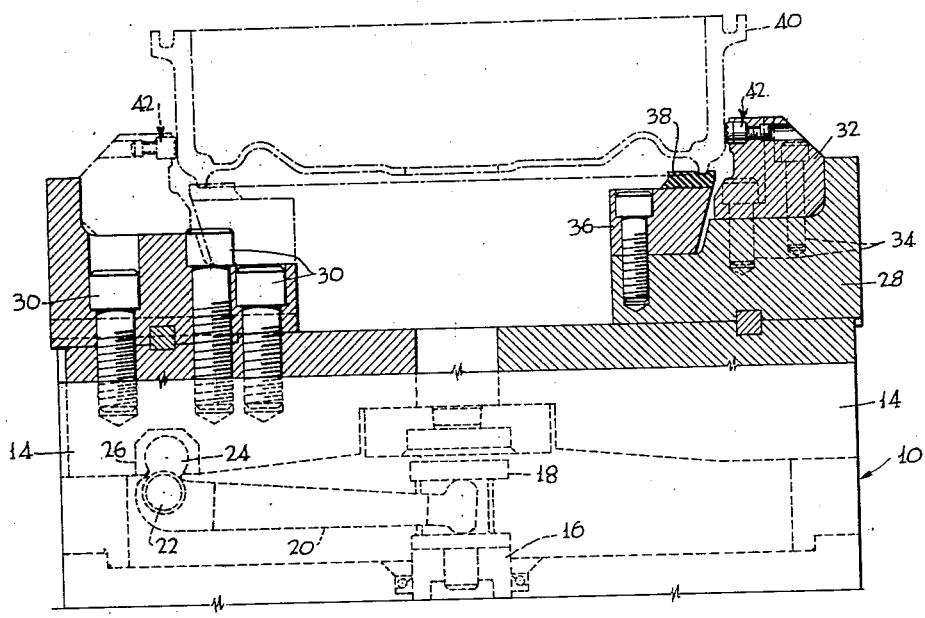
FIG. 2
INVENTOR.
Joseph P. Nicosia.
BY
John B. Sowell
ATTORNEY United States Patent Office 3,151,862
Patented Oct. 6, 1964

3,151,862
GRIPPING DEVICE FOR CHUCK JAWS
Joseph P. Nicosia, Detroit, Mich., assignor to The Budd Company, Philadelphia, Pa., a corporation of Pennsylvania
Filed Aug. 8, 1961, Ser. No. 130,162
9 Claims. (Cl. 269—273)

This invention relates to a new and improved gripper for chuck jaws and more particularly to an expendable carbide gripper which may be replaced without changing or resetting critical dimensions of the chuck body, chuck jaws or grippers.

Cylindrical work to be properly gripped by a set of chuck jaws requires that the workpiece be absolutely concentric with the center of rotation of the work-rotating spindle and that the radial distances of the work-engaging surfaces of the grippers are identical. In the past, the gripping surface of unitary chuck jaws have been turned or ground after the chuck jaws are attached in a fixed position to the chuck body. To overcome the obvious disadvantages and expense of such a system, chuck jaws have more recently been made in two pieces, one comprising a chuck jaw to be attached to the chuck body, and the other comprising the gripping surface.

Chuck jaws having replaceable gripping surface members have evolved into two basic methods of attachment. One method is to provide a gripping surface which is machined both front and back to very accurate machine tolerances. The chuck jaw provided for attachment with the machine gripper is further provided with a set of adjustment screws for aligning the gripper. If the chuck jaw is accurately machined it may be replaced by a similar part without realigning the adjustment screws of the chuck jaw. Such a device is described and shown in Patent No. 2,669,458. A second method is to provide a gripping surface which is not machined to accurate tolerances and when replaced requires that the adjustment screws in the chuck jaw be reset in order to have the gripping surface in perfect concentric and radial alignment.

This latter practice has been adopted by many shops because it has been found that slight changes in resetting pressure are sufficient to cause misalignment even when accurately machined gripping jaws are employed. It is believed that the adjusting screws employed on a small surface of the back of the gripper causes distortions in the gripper when tightened or that the holding means on the back of the gripper when tightened actually causes a slight bending of the gripper. When the gripper has an arcuate gripping face it very seldom fits the workpiece in full face contact causing slight inaccuracies which are sensitive to the chucking pressure applied. Thus it is often said that chuck jaws should be reset for different chucking pressures.

In the first instance a machined gripper is extremely expensive and difficult to make because the gripper is first machined and then must be heat-treated to produce a desired hardness, but has the advantage that it should not require a tool setting operation to replace a gripping jaw. In the second instance the gripper may be made relatively cheap but requires that a tool setter make an expensive and time consuming critical adjustment of the chuck jaw assembly. Heretofore, manufacturers have been willing to pay the high cost of machined grippers, especially on machines involving multiple spindles, which are employed on high rate production lines because a delay of a few hours would interrupt production schedules.

More recently, with the advent of high speed cutting tools the attrition rate of machine gripping surfaces has become very large and the associated costs are almost astronomical. It has been proposed that larger gripping jaws be made in order that greater chucking pressures may be employed but this also creates additional machining and tool setting problems.

It would be extremely desirable to provide a small gripping element capable of extremely high chucking pressures which could be made without machining operations and would further be replaceable without the requirement of a tool setter.

Therefore, it is a primary object of the present invention to provide a small expendable gripper for chuck jaws.

One of the main objects of the present invention is to provide a superior chuck-jaw unit having a replaceable gripping surface element, constructed and arranged so that the gripping face surface is securely held against displacement and is readily removable and replaceable.

It is a further object to provide a composite carbide gripper which may be made without machining or grinding.

It is a further object to provide a nonferrous gripper with a bonded ferrous backing plate.

It is another object to provide a refractory metal gripper with means for accurately attaching it to a chuck jaw.

It is a further object to provide a means for attaching non-ferrous grippers a to chuck jaw without the necessity of providing adjustment screws for resetting the gripping surface.

It is a further object to provide a non-adjustable replaceable gripper that is not sensitive to chucking pressures.

It is a further object to provide a non-adjustable replaceable gripper that has a flat front and rear face.

It is a further object to provide a replaceable gripper which has a surface hardness much greater than workpieces to be gripped.

In accordance with the invention there is provided a very hard gripper surface which has high strength in compression but is relatively brittle and difficult to machine; bonded to this hard gripper surface in face to face contact is a relatively soft metal backing plate which is capable of absorbing compression, shock and tension forces; the backing plate is provided with attaching means and a seating surface which mounts on a similar seating surface provided in a chuck jaw. The gripper surface and backing plate assembly are made in a small configuration to practically eliminate bending forces. Thus, the hard surface is only exposed to high compressive forces and the backing plate acts as a cushion intermediate the chuck jaws and the hard gripper surface. Forces exerted on the backing plate can easily exceed the allowable forces in the gripper surface without any harm to the assembly.

Further objects and features of the invention will be described hereinafter in detail with reference to the accompanying drawings in which:

FIG. 2 is a sectional elevation taken along line 2—2 of FIG. 1 showing the chuck body mounted on a machine spindle and the manner in which a workpiece is gripped by the jaws embodying the novel grippers.

FIG. 3 is an enlarged detail inside elevation of the novel gripper showing in phantom lines the two separable components of a preferred embodiment.

FIG. 4 is a front elevation of the novel gripper shown in FIG. 3.

Figure 1:
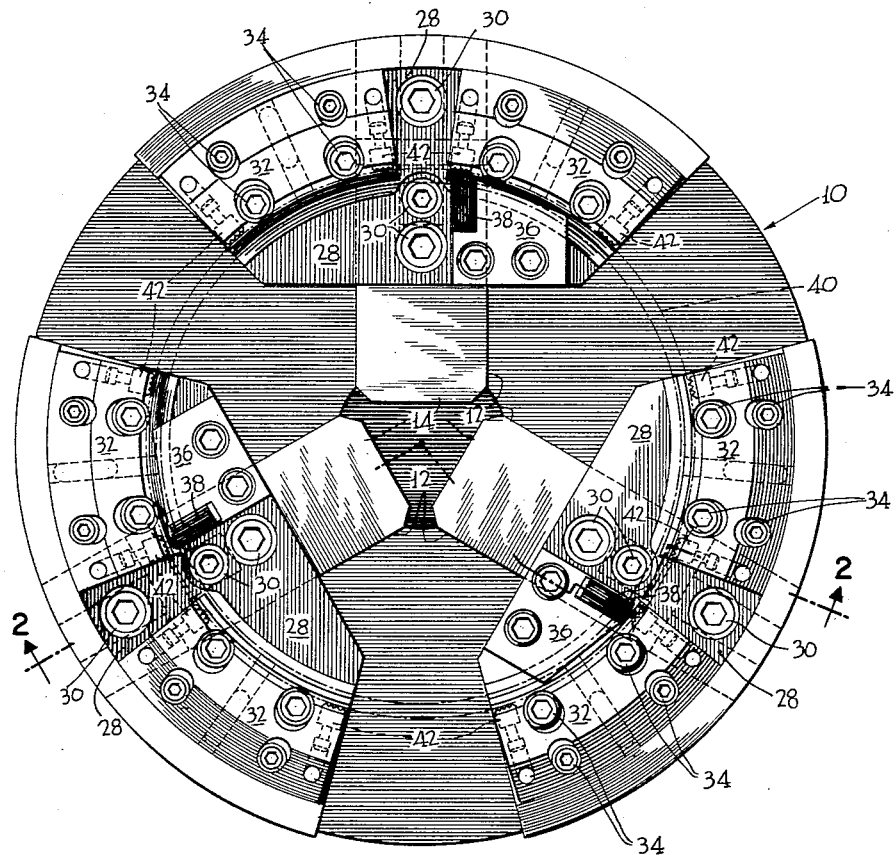
FIG. 1 is a plan view of a self-centering chuck body with six chuck jaws incorporating the invention mounted on three jaw converter adaptors.

In the chuck body 10 shown in FIG. 1 there are provided three jaw ways 12 disposed 120 degrees apart in which three slidable master chuck jaws 14 are adapted to be moved substantially radially relative to the axis of rotation of the chuck body 10. In FIG. 2 a draw bar 16 is shown coupled to a collar 18 in which one end of bell crank lever 20 is held. Bell crank lever 20 is pivoted at pin connection 22 for movement of the ball joint 24 which is held in a socket bearing 26 constituting a part of master jaw 14.

It can be seen that a vertical movement of the draw bar 16 causes a radial movement of the three master jaws 14. The chuck body and operating parts therein are illustrated in a manner common to power operated chucks and are well known to those familiar with multiple spindle power operated machine tools.

In FIGS. 1 and 2 jaw converter adaptors 28 are shown mounted to master jaws 14 by cap screws 30. Converter adaptor 28 acts as a supporting platform for two chuck jaws 32 connected thereto by cap screws 34. Both the converter adaptor 28 and the chuck jaws 32 are provided with key ways in a conventional manner to enable alignment and to lock the parts against movement during assembly. A slight amount of slack is provided in the keyways to allow for inherent inaccuracies in the manufacturing tolerances in the machining of the chuck body, adaptor and jaws.

A spacer 36 provided with a resilient pad 38 is shown mounted on the adaptor 28 in order to illustrate a preferred embodiment in which a cast iron brake drum 40 is held in working position. The illustrated embodiment shows a chuck body with three ways having three converter adaptors which permit the use of six chuck jaws but the invention may take the form of one or more pieces without departing from the principles of the invention.

The chuck jaws 32 are provided with the novel gripper assembly 42 shown in FIG. 3. Gripper assembly 42 is comprised of a gripper face 44, a backing plate 46 and screw attachment means 48. The gripper face is made from non-ferrous tool materials including combinations of tungsten-carbide, tantalum-carbide, titanium-carbide, columbium-carbide, cobalt, etc. Such tool materials are of the order of hardness of Rockwell A 82–94 or higher and much harder than any known heat-treated tool steels. Generally such tool materials are classed according to their method of preparation. Cemented carbides are prepared by powder metallurgy techniques although some carbide may be prepared by casting. Materials which do not lend themselves to sintering methods are form-cast. Nonferrous tool materials have one characteristic in common; they usually are finished-ground to final form.

The novel gripper face 44 has a flat face front and back and flat sides which permit the use of powder metallurgy techniques in a simple mold. Further, since the gripper is made in a small flat face configuration it has been found that the gripper face can be molded and sintered or cast to finished form without grinding. The face to face dimensions of the gripper face 44 are kept well under ±.003 inch deviation by standard manufacturing methods.

Backing plate 46 is preferably prepared from mild steel or cold rolled steel by a standard screw machine operation. The face to face dimension of the cold worked backing plate may be held to ±.002 inch by standard manufacturing methods.

The gripper face 44 is bonded to the backing plate 46 preferably by a alloy of the silver solder type which permits an adjustment of up to .005 inch. It can be seen that the novel gripper assembly 42 may be made by conventional methods to an accuracy as great as is necessary for any known chucking use without machining.

Carbide gripper faces 44 may be bonded to the backing plate 46 by other means such as high tension adhesives, but the silver solder alloys or brazing techniques lend themselves to rapid assembly and extreme accuracy. A preferred method of assembly has been found to be resistance heating of the bonding means 50 in series between the gripper face 44 and backing plate 46. If the electrodes, not shown, are spaced to a critical dimension they will simultaneously bond the elements together and create the desired accurate overall dimension. Resistance welding-bonding is also desirable for the heat of bonding is centralized at the bonding means 50 and does not become great enough to harm the carbide gripper face 44. Welding-bonding is instantaneous and does not require a jig, thus allowing mass production techniques.

Chuck jaw 32 is provided with apertures 52 having a machined face 54 therein. The machine face need not be made with the great degree of accuracy as required for some chuck jaws, for it is only necessary that the relative position of the machined face be fixed, and that the accurately made gripper assembly 42 fit flush each time. The aperture fits closely against the gripper assembly 42 in its working position which serves to prevent lateral displacement and avoid any change in face to face dimension of the assembly due to a change in chucking pressure. The novel tight fit design gripper assembly is not subject to dimensional changes as are arcuate grippers or pivoted grippers. Lateral support may be provided by extending the backing plate 46 to enclose the sides of gripper face 44, but extremely high working pressures require that the gripper assembly have lateral support of the chuck jaw aperture.

The gripper assembly 42 is held in the machined aperture by a single screw means which is readily accessible from the rear face of a raised flange on the chuck jaw 32. While a tapped backing plate 46 is illustrated with a screw means 48 the connection could be modified to a side connection or reversal of the screw means. Any stresses created by the screw means or a holding means are concentrated in the backing plate, and do not tend to bend the carbide face which would cause it to break.

*Résumé.*—In general use, the chuck jaws 32, adaptors 28 and spacers 36 may be set up by a tool-setter for a particular cylindrical object to be machined. During the course of machining with high speed tools the torque created as the object is turned often becomes great enough to cause the object to slip in the chuck jaws. Should the object be hard enough it can cause the teeth of the grippers to become worn or to be sheared off. If one or more grippers become worn or broken an extra load is placed on the remaining grippers which usually accelerates wear and breakage.

A casual examination of the object will reveal if the grippers are scoring the object or taking a bite. When it becomes obvious the grippers are not taking a bite the machining operation may be halted momentarily and each of the grippers examined visually. Those grippers that are cracked or worn may be replaced and thrown away by releasing the readily accessible screw means and inserting a new gripper assembly.

Replacement is always speedy and accurate without the requirement of a tool-setter.

The novel gripper assemblies for a set of chuck jaws are made at less than eighteen percent of the cost of the cheapest replaceable chuck jaws, but it has been found that the novel gripper allows higher chucking pressures and does not need replacement as often as the former types of replaceable jaws.

Not only does the novel gripper assembly completely eliminate tool-setting operations for replacement, but also eliminates idle workmen during jaw replacement. The ease with which the grippers are replaced permits preventive maintenance for it is no longer as costly as breakdown replacement.

Expensive inventories of chuck jaws have now been replaced with inexpensive throwaway grippers.

It is clear, therefore, that there is provided in accordance with this invention, an improved and simplified replaceable gripper assembly for chucking devices.

The form of the invention shown is only illustrative of the invention; various changes and modifications in the shape and holding means may be made by those skilled in the art without departing from the scope of the invention.

Having therefore described the nature and operation of the invention, those novel features believed descriptive of the scope of the invention are defined with particularity in the appended claims.

What is claimed is:
1. A replaceable gripper device for a chuck jaw having a recessed aperture,
  (A) a metal backing plate adapted to fit into said recessed aperture of said chuck jaw, said backing plate having
    (1) a rear face portion adapted to abut the bottom of said recessed aperture,
    (2) a front face portion, and
    (3) an edge face portion connecting said rear face portion and said front face portion,
  (B) a refractory metal gripper adapted to be joined to said metal backing plate, said gripper having
    (1) a rear face portion opposite said front face portion of said backing plate,
    (2) a serrated front face portion adapted to extend beyond said recessed aperture of said chuck jaw, and
    (3) an edge face portion connecting said rear face portion and said serrated face portion,
  (C) and a bonding layer connecting said rear face portion of said gripper and said front face portion of said backing plate providing an integral replaceable gripper device adapted to be inserted into a recessed aperture of a chuck jaw.

2. A replaceable gripper device for a chuck jaw having a recessed aperture,
  (A) a steel backing plate adapted to fit into said recessed aperture of said chuck jaw, said backing plate having
    (1) a rear face portion adapted to abut the bottom of said recessed aperture,
    (2) a front face portion, and
    (3) an edge face portion connecting said rear face portion and said front face portion,
  (B) a refractory metal gripper adapted to be joined to said steel backing plate, said gripper having
    (1) a rear face portion parallel to said front face portion of said backing plate,
    (2) a serrated front face portion adapted to extend beyond said recessed aperture of said chuck jaw, and
    (3) an edge face portion connecting said rear face portion and said serrated face portion,
  (C) and a fusion weld forming a connection between said rear face portion of said gripper and said front face portion of said backing plate providing an integral replaceable gripper device adapted to be inserted into a recessed aperture of a chuck jaw.

3. A replaceable gripper device for a chuck jaw having a recessed aperture,
  (A) a steel backing plate adapted to fit into said recessed aperture of said chuck jaw, said backing plate having
    (1) a rear face portion adapted to abut the bottom of said recessed aperture,
    (2) a front face portion, and
    (3) an edge face portion connecting said rear face portion and said front face portion, and
  (B) a hard metal carbide gripper adapted to be joined to said steel backing plate, said gripper having
    (1) a rear face portion parallel to said front face portion of said backing plate,
    (2) a serrated front face portion adapted to extend beyond said recessed aperture of said chuck jaw, and
    (3) an edge face portion connecting said rear face portion and said serrated face portion,
  (C) and a braze metal bonding layer connecting said rear face portion of said gripper and said front face portion of said backing plate providing an integral replaceable gripper device adapted to be inserted into a recessed aperture of a chuck jaw.

4. A replaceable gripper device for a chuck jaw having a recessed aperture,
  (A) a metal backing plate adapted to fit into said recessed aperture of said chuck jaw, said backing plate having
    (1) a rear face portion adapted to abut the bottom of said recessed aperture,
    (2) a front face portion,
    (3) an edge portion connecting said rear face portion and said front face portion, and
    (4) a machine screw threaded portion integral with said flat machined rear face portion,
  (B) a refractory metal gripper adapted to be joined to said metal backing plate, said gripper having
    (1) a rear face portion opposite said front face portion of said backing plate,
    (2) a serrated front face portion adapted to extend beyond said recessed aperture of said chuck jaw, and
    (3) an edge portion connecting said rear face portion and said serrated face portion,
  (C) a bonding layer of braze metal intermediate said rear face portion of said gripper and said front face portion of said backing plate connecting said gripper to said backing plate,
  (D) and screw means cooperating with said machine screw threaded portion of said backing plate for securing said backing plate into said recessed aperture of said chuck jaw.

5. A replaceable gripper device for a chuck jaw having a machined recessed aperture comprising:
  (A) a steel backing plate adapted to fit into said machined recessed aperture of said chuck jaw, said plate having
    (1) a flat machined rear face seating portion adapted to abut the bottom of said recessed aperture of said chuck jaw,
    (2) a machined front face attachment portion parallel to said rear face portion adapted to be connected to a gripper,
    (3) a machined edge face portion connecting said machined rear face portion and machined front face portion, said edge face portion being adapted to abut the sides of said recessed aperture, and
    (4) a machine screw threaded portion integral with said flat machined rear face portion,
  (B) a non-ferrous refractory metal gripper adapted to be joined to said steel backing plate, said gripper having
    (1) a rear face portion parallel to said machined front face portion of said backing plate,
    (2) a serrated front face portion adapted to extend beyond said recessed aperture of said chuck jaw, and
    (3) an edge portion connecting said rear face portion and said serrated face portion,
  (C) a bonding layer of braze metal intermediate said rear face portion of said gripper and said machined front face attachment portion of said backing plate connecting said gripper to said backing plate and providing an integral gripper device,
  (D) and screw means cooperating with said machine screw threaded portion of said backing plate for securing said backing plate and said integral gripper device in said aperture of said chuck jaw and causing said backing plate of said gripper device to seat in the machined recessed aperture of said chuck jaw.

6. A replaceable gripper device according to claim 1 wherein said metal backing plate and said serrated gripper are cylindrical in shape and adapted to fit tightly into said recessed aperture provided with cylindrical side walls and a flat machined bottom in said chuck jaw whereby compression and lateral thrust forces imposed on said refractory metal gripper are transmitted to said bottom and said side walls of said recessed aperture.

7. A replaceable gripper device according to claim 6 wherein said backing plate further includes attachment means and independent means cooperating with said attachment means for connecting said gripper device to said chuck jaw.

8. A replaceable gripper device according to claim 1 wherein said recessed aperture is provided in a vertical raised flange of said chuck jaw and wherein said backing plate further includes attachment means and independent means cooperating with said attachment means for connecting said gripper device to said chuck jaw, said gripper device extending from one face of said raised flange and said attachment means extending from another face of said raised flange, whereby said gripper device is easily removed and replaced from said chuck jaw without disturbing the setting of said chuck jaw.

9. A replaceable gripper device according to claim 8 wherein said attachment means and said independent means are provided with a cooperating screw thread, and said independent means is a threaded machine screw extending through the face opposite said face of said raised flange providing free access to said serrated gripper face and said threaded machine screw.

References Cited in the file of this patent

UNITED STATES PATENTS

| | | |
|---|---|---|
| 1,902,885 | Nixon | Mar. 28, 1933 |
| 2,669,458 | Johnson | Feb. 16, 1954 |
| 2,778,652 | Ingwer | Jan. 22, 1957 |
| 2,852,265 | Van Dinen | Sept. 16, 1958 |
| 2,919,925 | Snyder | Jan. 5, 1960 |
| 2,933,320 | Lyons | Apr. 19, 1960 |
| 3,090,614 | Freeman | May 21, 1963 |

FOREIGN PATENTS

| | | |
|---|---|---|
| 166,768 | Great Britain | July 28, 1921 |